US010129897B2

(12) United States Patent
Martin et al.

(10) Patent No.: US 10,129,897 B2
(45) Date of Patent: Nov. 13, 2018

(54) TELECOMMUNICATIONS APPARATUS AND METHODS

(71) Applicant: SONY CORPORATION, Tokyo (JP)

(72) Inventors: Brian Alexander Martin, Basingstoke (GB); Dimitris Koulakiotis, Basingstoke (GB); Jussi Tapani Kahtava, Basingstoke (GB); Rickard Ljung, Helsingborg (SE); Anders Berggren, Lund (SE); Peter C. Karlsson, Lund (SE); Lars Nord, Lund (SE)

(73) Assignee: Sony Corporation, Tokyo (JP)

( * ) Notice: Subject to any disclaimer, the term of this patent is extended or adjusted under 35 U.S.C. 154(b) by 97 days.

(21) Appl. No.: 15/305,999

(22) PCT Filed: May 21, 2015

(86) PCT No.: PCT/EP2015/061298
§ 371 (c)(1),
(2) Date: Oct. 21, 2016

(87) PCT Pub. No.: WO2015/185370
PCT Pub. Date: Dec. 10, 2015

(65) Prior Publication Data
US 2017/0048875 A1   Feb. 16, 2017

(30) Foreign Application Priority Data

Jun. 5, 2014   (EP) .................................... 14171285

(51) Int. Cl.
H04L 5/00   (2006.01)
H04W 16/14   (2009.01)
(Continued)

(52) U.S. Cl.
CPC .......... *H04W 72/085* (2013.01); *H04L 5/001* (2013.01); *H04L 5/006* (2013.01); *H04L 5/0087* (2013.01);
(Continued)

(58) Field of Classification Search
CPC ..... H04L 5/0001; H04L 5/006; H04L 5/0087; H04L 5/0091–5/0098;
(Continued)

(56) References Cited

U.S. PATENT DOCUMENTS

2012/0077510 A1   3/2012   Chen et al.
2014/0087748 A1   3/2014   Hong et al.
(Continued)

FOREIGN PATENT DOCUMENTS

WO    2012/162875 A1   12/2012
WO    WO 2012162875 A1 * 12/2012   ........ H04W 72/1215
(Continued)

OTHER PUBLICATIONS

International Search Report dated Aug. 17, 2015 in PCT/EP2015/061298 filed May 21, 2015.
(Continued)

Primary Examiner — Timothy J Weidner
(74) Attorney, Agent, or Firm — Xsensus, LLP

(57) ABSTRACT

A method of operating a terminal device and a base station in a wireless telecommunications system to communicate with one another using a primary component carrier operating on radio resources within a first frequency band and a secondary component carrier operating on radio resources within a second frequency band. The terminal device makes measurements of radio usage in the second frequency band, and transmits an indication of the measurements to the base station. The base station then establishes a configuration setting for the secondary component carrier. The configu-
(Continued)

ration setting is associated with a validity period during which the base station communicates data to the terminal device using the primary component carrier and the secondary component carrier operating in accordance with its configuration setting.

26 Claims, 5 Drawing Sheets

(51) Int. Cl.
*H04W 72/04* (2009.01)
*H04W 72/08* (2009.01)
*H04W 76/38* (2018.01)
*H04W 84/04* (2009.01)
*H04W 84/12* (2009.01)

(52) U.S. Cl.
CPC ........... *H04L 5/0096* (2013.01); *H04W 16/14* (2013.01); *H04W 72/042* (2013.01); *H04W 76/38* (2018.02); *H04W 84/042* (2013.01); *H04W 84/12* (2013.01)

(58) Field of Classification Search
CPC ........ H04W 8/22–8/245; H04W 16/14–16/32; H04W 24/02; H04W 24/04; H04W 24/10; H04W 36/14–36/385; H04W 36/0055–36/0077; H04W 28/1215; H04W 28/0221; H04W 28/0231–28/0268; H04W 28/16–28/26; H04W 56/0095; H04W 72/04–72/0453; H04W 72/048–72/10; H04W 72/1215–72/14; H04W 76/10–76/38; H04W 84/042; H04W 84/12
See application file for complete search history.

(56) References Cited

U.S. PATENT DOCUMENTS

2014/0378157 A1* 12/2014 Wei .................. H04W 16/14
                                                    455/454
2015/0223243 A1*  8/2015 Tabet ................ H04W 28/085
                                                    370/330
2015/0256305 A1*  9/2015 Yerramalli ............ H04W 76/38
                                                    370/311

FOREIGN PATENT DOCUMENTS

WO      2013/006988 A1    1/2013
WO   WO 2013006988 A1 *   1/2013   ............ H04W 16/14

OTHER PUBLICATIONS

Harri Holma et al., "LTE for UMTS OFDMA and SC-FDMA based radio access," John Wiley and Sons, 2009, 4 pages.
"LTE; Evolved Universal Terrestrial Radio Access (E-UTRA); Physical channels and modulation (3GPP TS 36.211 version 11.5.0 Release 11)", ETSI TS 136 211 V11.5.0, Jan. 2014, 122 pages.
"LTE; Evolved Universal Terrestrial Radio Access (E-UTRA); Multiplexing and channel coding (3GPP TS 36.212 version 11.4.0 Release 11),", ETSI TS 136 212 V11.4.0 Jan. 2014, 86 pages.
"LTE; Evolved Universal Terrestrial Radio Access (E-UTRA); Physical layer procedures (3GPP TS 36.213 version 11.6.0 Release 11)", ETSI TS 36 213 V11.6.0, Mar. 2014, 184 pages.
"LTE; Evolved Universal Terrestrial Radio Access (E-UTRA); Medium Access Control (MAC) protocol specification (3GPP TS 36.321 version 11.5.0 Release 11)", ETSI TS 136 321 V11.5.0, Mar. 2014, 59 pages.
LTE; Evolved Universal Terrestrial Radio Access (E-UTRA); Radio Resource Control (RRC); Protocol specification (3GPP TS 36.331 version 11.7.0 Release 11), ETSI TS 136 331 V11.7.0, Mar. 2014, 354 pages.

* cited by examiner

TELECOMMUNICATIONS APPARATUS AND METHODS

CROSS-REFERENCE TO RELATED APPLICATIONS

The present application is based on PCT filing PCT/EP2015/061298 filed May 21, 2013, and claims priority to European Patent Application 14 171 285.1, filed in the European Patent Office on Jun. 5, 2014, the entire contents of each of which being incorporated herein by reference.

BACKGROUND

Field

The present disclosure relates to mobile communications networks and methods for communicating data using mobile communications networks, infrastructure equipment for mobile communications networks, communications devices for communicating data via mobile communications networks and methods of communicating via mobile communications networks.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It is well known in the field of wireless telecommunications for regions of the radio spectrum to be assigned to different mobile network operators (MNO) for their exclusive use through a license. A license typically grants an MNO exclusive use over a number of years of a predefined portion of the radio frequency spectrum in which to deploy a mobile communications network (e.g. GSM, WCDMA/HSPA, LTE/LTE-A). As a result of this approach, an operator has guarantees of no other radio services interfering with the radio resources that have been assigned to the operator, and within the limitations of the license conditions it has exclusive control over what radio technology it deploys in the network. Consequently, a wireless telecommunications system that is primarily designed to operate using radio resources that have been licensed for exclusive use by the wireless telecommunications system can operate with a degree of centralised control and coordination to help make most efficient use of the available radio resources. Such a wireless telecommunication system also manages all the interference internally, based on standard specifications, since the license grants it good immunity from external interference sources. Coexistence of different devices deployed on an MNO's licensed band is managed through conformance to relevant radio standards. Licensed spectrum is today usually assigned to operators via government-organised auctions, but so-called "beauty contests" continue also to be in use.

It is also well known in the field of wireless telecommunications for regions of the available radio spectrum to remain unlicensed. Unlicensed (license exempt) radio spectrum may, at least to some extent, be freely used by a number of different technologies, such as Wi-Fi and Bluetooth and other non-3GPP radio access technologies. Operating parameters for devices using unlicensed spectrum bands are typically stipulated by technical regulatory requirements such as e.g. the FCC Part 15 rule for 2.4 GHz ISM band. Coexistence of different devices deployed on unlicensed band, due to the lack of centralised coordination and control, is usually based on such technical rules and various politeness protocols.

The use of wireless telecommunications system technologies designed for operation on licensed radio spectrum, such as LTE, is becoming more and more prevalent, both in terms of increasing take-up of established uses for wireless telecommunications technologies, and also the introduction of new uses, e.g., in the developing field of machine-type communications (MTC). In order to help provide more bandwidth to support this increased use of wireless telecommunications technologies, it has recently been proposed to use unlicensed radio spectrum resources to support operations on licensed radio spectrum.

However, in contrast to licensed spectrum, unlicensed spectrum can be shared and used among different technologies, or different networks using the same technology, without any co-ordinated/centralised control, for example to provide protection against interference. As a consequence of this, the use of wireless technologies in unlicensed spectrum can be subject to unpredictable interference and has no guarantees of spectrum resources, i.e. the radio connection takes place on a best effort basis. This means that wireless network technologies, such as LTE, which are generally designed to operate using licensed radio resources, require modified approaches to allow them to efficiently use unlicensed radio resources, and in particular to co-exist reliably and fairly with other radio access technologies that may be simultaneously operating in the unlicensed spectrum band.

Therefore, deploying a mobile radio access technology system primarily designed to operate in licensed spectrum bands (i.e. having exclusive access to, and hence a level of control over, the relevant radio resources) in a manner which is required by operation in unlicensed spectrum bands (i.e. without having exclusive access to at least some of the relevant radio resources), gives rise to new technical challenges.

SUMMARY

According to an aspect of the disclosure there is provided a method of operating a terminal device in a wireless telecommunications system for communicating with network infrastructure equipment using a primary component carrier operating on radio resources within a first frequency band and a secondary component carrier operating on radio resources within a second frequency band, wherein the method comprises the steps: (a) receiving an indication of a configuration setting for the secondary component carrier from the network infrastructure equipment; (b) establishing a validity period for the configuration setting for the secondary component carrier; and (c) receiving data from the network infrastructure equipment using the primary component carrier and the secondary component carrier operating in accordance with the configuration setting for the secondary component carrier during the validity period for the configuration setting.

According to another aspect of the disclosure there is provided a terminal device for use in a wireless telecommunications system for communicating with network infrastructure equipment using a primary component carrier operating on radio resources within a first frequency band and a secondary component carrier operating on radio resources within a second frequency band, wherein the terminal device comprises a controller unit and a transceiver unit configured to operate together to: (a) receive an indication of a configuration setting for the secondary component carrier from the network infrastructure equipment; (b) establish a validity period for the configuration setting for the secondary component carrier; and (c) receive data from the network infrastructure equipment using the primary component carrier and the secondary component carrier operating in accordance with the configuration setting for the secondary component carrier during the validity period for the configuration setting.

According to another aspect of the disclosure there is provided circuitry for a terminal device for use in a wireless telecommunications system for communicating with network infrastructure equipment using a primary component carrier operating on radio resources within a first frequency band and a secondary component carrier operating on radio resources within a second frequency band, wherein the circuitry comprises a controller element and a transceiver element configured to operate together to: (a) receive an indication of a configuration setting for the secondary component carrier from the network infrastructure equipment; (b) establish a validity period for the configuration setting for the secondary component carrier; and (c) receive data from the network infrastructure equipment using the primary component carrier and the secondary component carrier operating in accordance with the configuration setting for the secondary component carrier during the validity period for the configuration setting.

According to another aspect of the disclosure there is provided a method of operating network infrastructure equipment in a wireless telecommunications system for communicating with a terminal device using a primary component carrier operating on radio resources within a first frequency band and a secondary component carrier operating on radio resources within a second frequency band, wherein the method comprises the steps: (a) establishing an indication of radio usage in the second frequency band; (b) determining a configuration setting for the secondary component carrier based on the indication of radio usage in the second frequency band; (d) establishing a validity period for the configuration setting for the secondary component carrier; (e) transmitting an indication of the configuration setting for the secondary component carrier to the terminal device; (f) transmitting data to the terminal device using the primary component carrier and the secondary component carrier operating in accordance with the configuration setting for the secondary component carrier during the validity period for the configuration setting; and (g) determining if the validity period for the configuration setting for the secondary component carrier has expired, and if so, repeating steps (a) and (b).

According to another aspect of the disclosure there is provided network infrastructure equipment for use in a wireless telecommunications system for communicating with a terminal device using a primary component carrier operating on radio resources within a first frequency band and a secondary component carrier operating on radio resources within a second frequency band, wherein the network infrastructure equipment comprises a controller unit and a transceiver unit configured to operate together to: (a) establish an indication of radio usage in the second frequency band; (b) determine a configuration setting for the secondary component carrier based on the indication of measurements of radio usage in the second frequency band; (d) establish a validity period for the configuration setting for the secondary component carrier; (e) transmit an indication of the configuration setting for the secondary component carrier to the terminal device; (f) transmit data to the terminal device using the primary component carrier and the secondary component carrier operating in accordance with the configuration setting for the secondary component carrier during the validity period for the configuration setting; and (g) determine if the validity period for the configuration setting for the secondary component carrier has expired, and if so, frequency band made by the terminal device and determine a configuration setting for the secondary component carrier based on the received measurements of radio usage in the second frequency band.

According to another aspect of the disclosure there is provided circuitry for network infrastructure equipment for use in a wireless telecommunications system for communicating with a terminal device using a primary component carrier operating on radio resources within a first frequency band and a secondary component carrier operating on radio resources within a second frequency band, wherein the circuitry comprises a controller element and a transceiver element configured to operate together to: (a) establish an indication of measurements of radio usage in the second frequency band; (b) determine a configuration setting for the secondary component carrier based on the indication of measurements of radio usage in the second frequency band; (d) establish a validity period for the configuration setting for the secondary component carrier; (e) transmit an indication of the configuration setting for the secondary component carrier to the terminal device; (f) transmit data to the terminal device using the primary component carrier and the secondary component carrier operating in accordance with the configuration setting for the secondary component carrier during the validity period for the configuration setting; and (g) determine if the validity period for the configuration setting for the secondary component carrier has expired, and if so, to again receive from the terminal device an indication of measurements of radio usage in the second frequency band made by the terminal device and determine a configuration setting for the secondary component carrier based on the received measurements of radio usage in the second frequency band.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
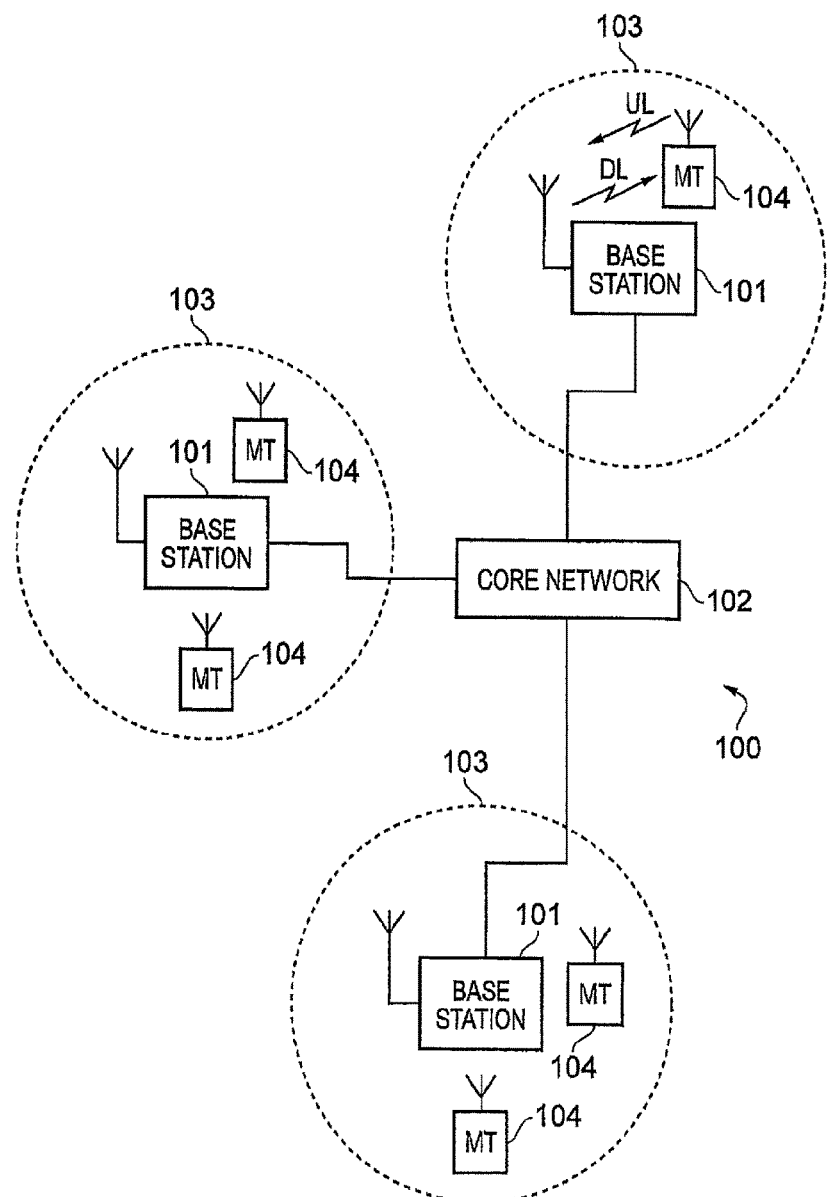
FIG. 1 provides a schematic diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licensed for use by the operator of the network 100. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-nodeBs, and so forth.

Figure 2:
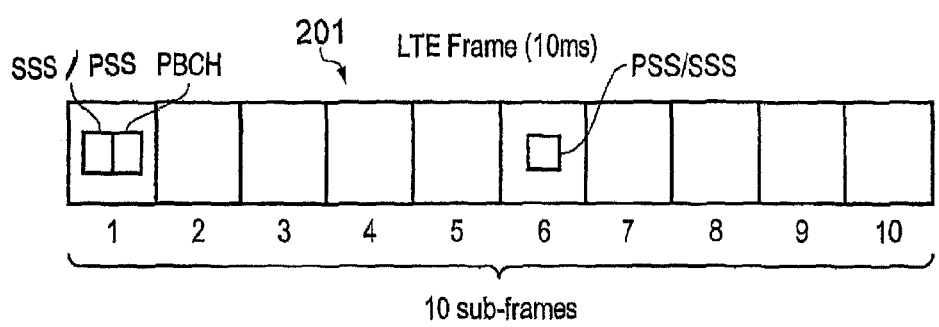
FIG. 2 provides a schematic diagram illustrating a LTE radio frame.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. FIG. 2 shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
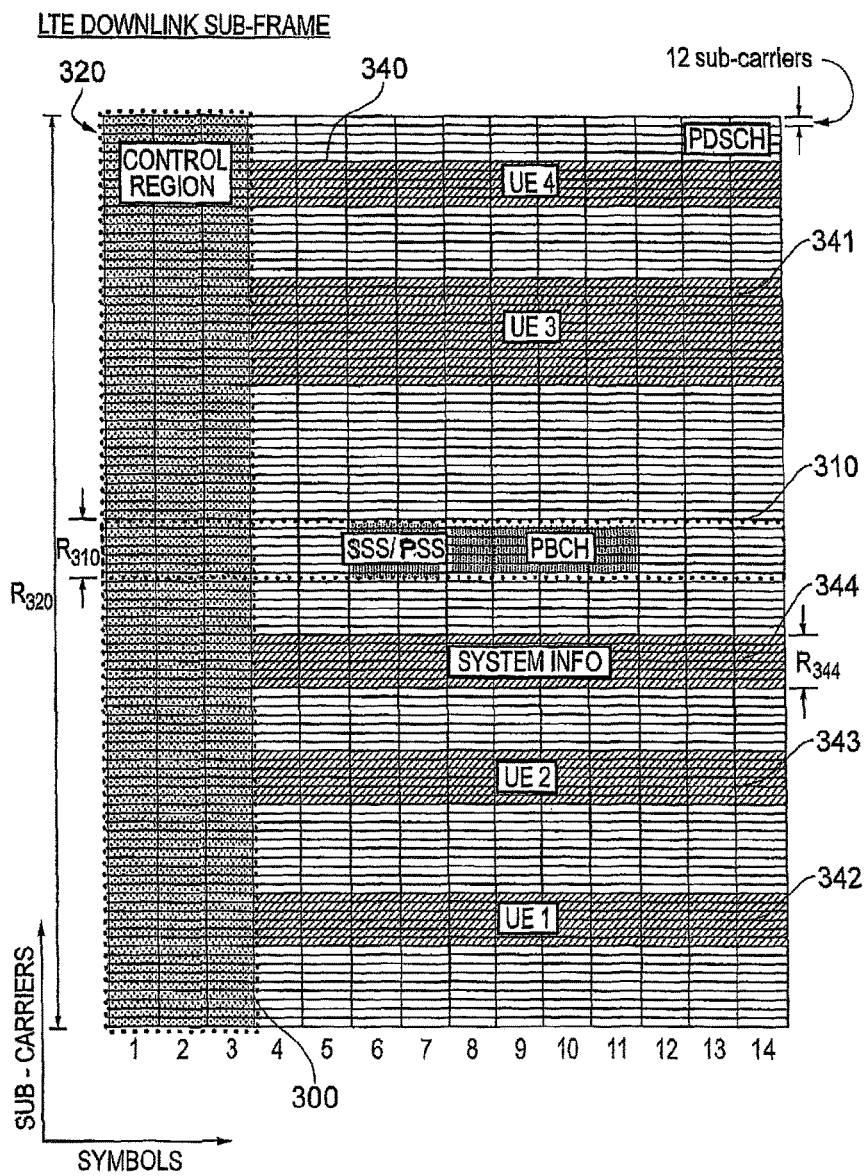
FIG. 3 provides a schematic diagram illustrating an example of a LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth licensed for use by the operator of the network 100, and this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE terminals 340, 341, 342, 343. For example, the resource allocation 342 for a first LTE terminal (UE 1) extends over five blocks of twelve subcarriers (i.e. 60 subcarriers), the resource allocation 343 for a second LTE terminal (UE2) extends over six blocks of twelve subcarriers (i.e. 72 subcarriers), and so on.

Control channel data can be transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The data transmitted in this second region is transmitted on the enhanced physical downlink control channel (EPDCCH). This channel transmits physical layer control information which may be in addition to that transmitted on other physical layer control channels.

PDCCH and EPDCCH contain control data indicating which subcarriers of the subframe have been allocated to specific terminals (or all terminals or subset of terminals). This may be referred to as physical-layer control signalling/data. Thus, the PDCCH and/or EPDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow a LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to terminals on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

FIG. 3 also shows a region of PDSCH containing system information and extending over a bandwidth of R344. A conventional LTE subframe will also include reference signals which are not shown in FIG. 3 in the interests of clarity.

The number of subcarriers in a LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity.

The communications between the base stations 101 and the terminal devices 104 are conventionally made using radio resources that have been licensed for exclusive use by the operator of the network 100. These licensed radio resources will be only a portion of the overall radio spectrum. Other devices within the environment of the network 100 may be wirelessly communicating using other radio resources. For example, a different operator's network may be operating within the same geographical region using different radio resources that have been licensed for use by the different operator. Other devices may be operating using other radio resources in an unlicensed radio spectrum band, for example using Wi-Fi or Bluetooth technologies.

As noted above, it has been proposed that a wireless telecommunications network using radio resources in a licensed portion of the radio spectrum might be supported by using radio resources in an unlicensed portion of the radio spectrum (i.e. a portion of the radio spectrum over which the wireless telecommunications network does not have exclusive access, but rather which is shared by other access technologies and/or other wireless telecommunications networks). In particular, it has been proposed that carrier aggregation based techniques may be used to allow unlicensed radio resources to be used in conjunction with licensed radio resources.

In essence, carrier aggregation allows for communications between a base station and a terminal device to be made using more than one carrier. This can increase the maximum data rate that may be achieved between a base station and a terminal device as compared to when using only one carrier and can help enable more efficient and productive use of fragmented spectrum. Individual carriers that are aggregated are commonly referred to as component carriers (or sometimes simply components). In the context of LTE, carrier aggregation was introduced in Release 10 of the standard. In accordance with the current standards for carrier aggregation in an LTE-based system, up to five component carriers can be aggregated for each of downlink and uplink. The component carriers are not required to be contiguous with one another and can have a system bandwidth corresponding to any of the LTE-defined values (1.4 MHz, 3 MHz, 5 MHz, 10 MHz, 15 MHz and 20 MHz), thereby allowing a total bandwidth of up to 100 MHz. Of course it will be appreciated this is just one example of a specific carrier aggregation implementation and other implementations may allow for different numbers of component carriers and/or bandwidths.

Further information on the operation of carrier aggregation in the context of LTE-based wireless telecommunications systems can be found in the relevant standards documents, such as ETSI TS 136 211 V11.5.0 (2014-January)/3GPP TS 36.211 version 11.5.0 Release 11 [2], ETSI TS 136 212 V11.4.0 (2014-January)/3GPP TS 36.212 version 11.4.0 Release 11 [3]; ETSI TS 136 213 V11.6.0 (2014-March)/3GPP TS 36.213 version 11.6.0 Release 11 [4]; ETSI TS 136 321 V11.5.0 (2014 March)/3GPP TS 36.321 version 11.5.0 Release 11 [5]; and ETSI TS 136 331 V11.7.0 (2014-March)/3GPP TS 36.331 version 11.7.0 Release 11 [6].

In accordance with the terminology and implementation used for carrier aggregation in the context of an LTE-based system, a cell is denoted the 'primary cell', or Pcell, for a terminal device if it is the cell that is initially configured during connection setup for the terminal device. Thus the primary cell handles RRC (radio resource control) connection establishment/re-establishment for the terminal device. The primary cell is associated with a downlink component carrier and an uplink component carrier (CoC). These may sometimes be referred to herein as primary component carriers. A cell that is configured for use by the terminal device after initial connection establishment on the Pcell is termed a 'secondary cell', or Scell. Thus the secondary cells are configured after connections establishment to provide additional radio resources. The carriers associated with Scells may sometimes be referred to herein as secondary component carriers. Since in LTE up to five component carriers can be aggregated, up to four Scells (correspondingly associated with up to four secondary component carriers) can be configured for aggregation with the primary cell (associated with the primary component carrier). An Scell might not have both a downlink and uplink component carrier and the association between uplink component carriers and downlink component carriers is signalled in SIB2 on each downlink component carrier. The primary cell supports PDCCH and PDSCH on downlink and PUSCH and PUCCH on uplink whereas the secondary cell(s) support PDCCH and PDSCH on downlink and PUSCH on uplink, but not PUCCH. Measurement and mobility procedures are handled on the Pcell and the Pcell cannot be de-activated. The Scell(s) may be dynamically activated and deactivated, for example according to traffic needs, though MAC layer signalling to the terminal device. An Scells for a terminal device may also be deactivated automatically (time out) if the terminal device does not receive any transmission resource allocations on the Scell for a threshold amount of time.

Some aspects of physical layer control signalling for an LTE-based implementation of carrier aggregation based on the current standards are now described.

Each downlink component carrier has the normal LTE control channels: (E)PDCCH, PCFICH and PHICH. However, carrier aggregation introduces the possibility of so-called cross-carrier scheduling (XCS) on PDCCH. To support cross-carrier scheduling, a downlink control information (DCI) message on PDCCH includes a carrier indicator field (CIF) comprising three bits to indicate which of the component carriers the PDCCH message applies to. If there is no CIF, the PDCCH is treated as applying to the carrier on which it is received. A motivation for providing cross-carrier scheduling primarily applies for heterogeneous network (het-net) scenarios where overlaid macro- and small-cells may operate carrier aggregation in the same band. The effects of interference between the respective macro- and small-cells' PDCCH signalling can be mitigated by having the macro-cell transmit its PDCCH signalling on one component carrier at relatively high transmit power (to provide coverage across the macro-cell), while the small-cells use an alternative component carrier for their PDCCH scheduling.

The control region supporting PDCCH may differ in size (i.e. number of OFDM symbols) between component carriers, so they can carry different PCFICH values. However, the potential for interference in the control region in a het-net implementation may mean that PCFICH cannot be decoded on a particular component carrier. Therefore, current LTE standards allow for each component to carrier a semi-static indication of which OFDM symbol PDSCH can be assumed to begin in each subframe. If fewer OFDM symbols are actually used for the control region, the free/spare OFDM symbol(s) may be used for PDSCH transmissions to terminal devices which are not being cross-carrier scheduled as they will decode the actual PCFICH. If more OFDM symbols actually used for the control region, there will be some degree of performance degradation for the cross-carrier scheduled terminal devices.

PHICH signalling is sent on the downlink component carrier that sent the PDCCH signalling containing the PUSCH allocation to which the PHICH signalling relates. Accordingly, one downlink component carrier may carry PHICH for more than one component carrier.

In the uplink, the basic operation of PUCCH is not altered by the introduction of carrier aggregation. However, a new PUCCH format (format 3) is introduced to support the sending of acknowledgement signalling (ACK/NACK signalling) for multiple downlink component carriers, and with some alterations to format 1b to increase the number of ACK/NACK bits it can carry.

In current LTE-based carrier aggregation scenarios, primary and secondary synchronisation signalling (PSS and SSS) are transmitted on all component carriers using the same physical-layer cell identity (PCI) and component carriers are all synchronised with one another. This can help with cell search and discovery procedures. Issues relating to security and system information (SI) are handled by the Pcell. In particular, when activating an Scell, the Pcell delivers the relevant SI for the Scell to the terminal device using dedicated RRC signalling. If the system information relating to a Scell changes, the Scell is released and re-added by Pcell RRC signalling (in one RRC message). Pcell changes, e.g. due to long-term fluctuations in channel quality across the Pcell bandwidth, are handled using a modified handover procedure. The source Pcell passes all the relevant carrier aggregation (CA) information to the target Pcell so the terminal device can begin to use all the assigned component carriers when handover is complete.

Random access procedures are primarily handled on the uplink component carrier of Pcell for a terminal device, although some aspects of contention resolution signalling may be cross-carrier scheduled to another serving cell (i.e. an Scell).

As noted above, carrier aggregation is one approach for making use of unlicensed radio spectrum resources in wireless communication networks which are primarily designed to use licensed radio spectrum. In broad summary, a carrier aggregation based approach may be used to configure and operate a first component carrier (e.g. a primary component carrier associated with a Pcell in LTE terminology) within a region of the radio spectrum that has been licensed for use by a wireless telecommunications network, and to also configure and operate one or more further component carriers (e.g. a secondary component carrier associated with an Scell in LTE terminology) in an unlicensed region of the radio spectrum. The secondary component carrier(s) operating in the unlicensed region of the radio spectrum may do so in an opportunistic manner by making use of the unlicensed radio resources when they are available. There may also be provisions made for restricting the extent to which a given operator can make use of the unlicensed radio resources, for example by defining what might be referred to as politeness protocols.

Although known carrier aggregation schemes can form a basis for using unlicensed radio spectrum resources (or other forms of shared radio resources) in conjunction with licensed radio spectrum resources, some modifications to known carrier aggregation techniques may be appropriate to help optimise performance. This is because radio interference in the unlicensed radio spectrum can be expected to be subject to a wider range of unknown and unpredictable variations in time and frequency than might be seen within a region of the radio spectrum which has been licensed for use by a particular wireless applications system. For a given wireless telecommunications system operating in accordance with a given technology, such as LTE-A, interference in the unlicensed radio spectrum may arise from other systems operating quantity same technology, or systems operating according to different technologies, such as Wi-Fi or Bluetooth.

Figure 4:
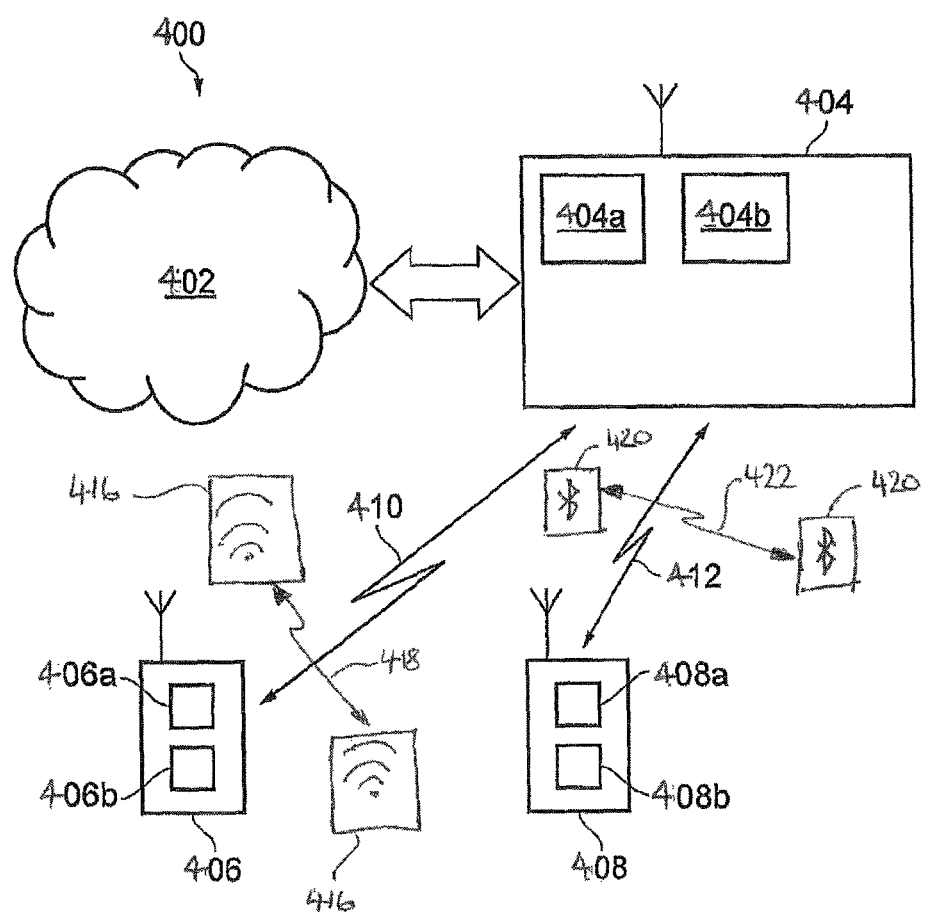
FIG. 4 schematically represents a wireless telecommunications system according to an embodiment of the disclosure.

FIG. 4 schematically shows a telecommunications system 400 according to an embodiment of the disclosure. The telecommunications system 400 in this example is based broadly on a LTE-type architecture. As such many aspects of the operation of the telecommunications system 400 are standard and well understood and not described here in detail in the interest of brevity. Operational aspects of the telecommunications system 400 which are not specifically described herein may be implemented in accordance with any known techniques, for example according to the established LTE-standards and known variations thereof.

The telecommunications system 400 comprises a core network part (evolved packet core) 402 coupled to a radio network part. The radio network part comprises a base station (evolved-nodeB) 404, a first terminal device 406 and a second terminal device 408. It will of course be appreciated that in practice the radio network part may comprise a plurality of base stations serving a larger number of terminal devices across various communication cells. However, only a single base station and two terminal devices are shown in FIG. 4 in the interests of simplicity.

Although not part of the telecommunications system 400 itself, also shown in FIG. 4 are some other devices which are operable to wirelessly communicate with one another and which are operating within the radio environment of the telecommunications system 400. In particular, there is a pair of wireless access devices 416 communicating with one another via radio link 418 operating in accordance with a Wi-Fi standard and a pair of Bluetooth devices 420 communicating with one another via radio link 422 operating in accordance with a Bluetooth standard. These other devices represent a potential source of radio interference for the telecommunications system 400. It will be appreciated that in practice there will typically be many more such devices operating in the radio environment of the wireless telecommunications system 400, and only two pairs of devices 416, 418 are shown in FIG. 4 for simplicity.

As with a conventional mobile radio network, the terminal devices 406, 408 are arranged to wirelessly communicate data to and from the base station (transceiver station) 404. The base station is in turn communicatively connected to a serving gateway, S-GW, (not shown) in the core network part which is arranged to perform routing and management of mobile communications services to the terminal devices in the telecommunications system 400 via the base station 404. In order to maintain mobility management and connectivity, the core network part 402 also includes a mobility management entity (not shown) which manages the enhanced packet service, EPS, connections with the terminal devices 406, 408 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 402 to an external packet data network, for example the Internet. As noted above, the operation of the various elements of the communications system 400 shown in FIG. 4 may be broadly conventional apart from where modified to provide functionality in accordance with embodiments of the disclosure as discussed herein.

The terminal devices 406, 408 each comprise a transceiver unit 406a, 408a for transmission and reception of wireless signals and a controller unit 406b, 408b configured to control the operation of the respective devices 406, 408 in accordance with embodiments of the disclosure. The respective controller units 406b, 408b may each comprise a processor unit which is suitably configured/programmed to provide the desired functionality described herein using conventional programming/configuration techniques for equipment in wireless telecommunications systems. For each of the terminal devices 406, 408, their respective transceiver units 406a, 408a and controller units 406b, 408b are schematically shown in FIG. 4 as separate elements for ease of representation. However, it will be appreciated that for each terminal device the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminal devices 406, 408 will in general comprise various other elements associated with their operating functionality in accordance with established wireless telecommunications techniques (e.g. a power source, possibly a user interface, and so forth).

As has become commonplace in the field of wireless telecommunications, terminal devices may support Wi-Fi and Bluetooth functionality in addition to cellular/mobile telecommunications functionality. Thus the transceiver units 406a, 408a of the respective terminal devices may comprise functional modules operable according to different wireless communications operating standards. For example, the terminal devices' transceiver units may each comprise an LTE transceiver module for supporting wireless communications in accordance with an LTE-based operating standard, a WLAN transceiver module for supporting wireless communications in accordance with a WLAN operating standard (e.g. a Wi-Fi with a Bluetooth operating standard. The underlying functionality of the different transceiver modules may be provided in accordance with conventional techniques. For example, a terminal device may have separate hardware elements to provide the functionality of each transceiver module, or alternatively, a terminal device might comprise at least some hardware elements which are configurable to provide some or all functionality of multiple transceiver modules. Thus the transceiver units 406a, 408a of the terminal devices 406, 408 represented in FIG. 4 are assumed here to provide the functionality of an LTE transceiver module, a Wi-Fi transceiver module and a Bluetooth transceiver module in accordance with conventional wireless communications techniques.

The base station 404 comprises a transceiver unit 404a for transmission and reception of wireless signals and a controller unit 404b configured to control the base station 404. The controller unit 404b may comprise a processor unit which is suitably configured/programmed to provide the desired functionality described herein using conventional programming/configuration techniques for equipment in wireless telecommunications systems. The transceiver unit 404a and the controller unit 404b are schematically shown in FIG. 4 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 404 will in general comprise various other elements associated with its operating functionality. For example, the base station 404 will in general comprise a scheduling entity responsible for scheduling communications. The functionality of the scheduling entity may, for example, be subsumed by the controller unit 404b.

Thus, the base station 404 is configured to communicate data with the first and second terminal devices 406, 408 over respective first and second radio communication links 410, 412. The wireless telecommunications system 400 supports a carrier aggregation mode of operation in which the first and second radio communication links 410, 412 each comprise a wireless access interface provided by multiple component carriers. For example, each radio communication link may comprise a primary component carrier and one or more secondary component carriers. Furthermore, the elements comprising the wireless telecommunications system 400 in accordance with this embodiment of the disclosure are assumed to support carrier aggregation in an unlicensed spectrum mode. In this unlicensed spectrum mode the base station communicates with terminal devices using a primary component carrier operating on radio resources within a first frequency band that has been licensed for use by the wireless telecommunications system and one or more secondary component carriers operating on radio resources within a second frequency band that has not been licensed for exclusive use by the wireless telecommunications system. The first frequency band may sometimes be referred to herein as a licensed frequency band and the second frequency band may sometimes be referred to herein as an unlicensed (U) frequency band. In the context of an LTE-based wireless telecommunications system, such as that represented in FIG. 4, operation in the unlicensed frequency band may be referred to as an LTE-U mode of operation. The first (licensed) frequency band may be referred to as an LTE band (or more particularly an LTE-A band) and the second (unlicensed) frequency band may be referred device able to make use of U-resources may be referred to as a U-terminal device (or U-UE). More generally, the qualifier "U" may be used herein to conveniently identify operations in respect of the unlicensed frequency band.

It will be appreciated that the use of carrier aggregation techniques and the use of unlicensed spectrum resources (i.e. resources that may be used by other devices without centralised coordination) in accordance with embodiments of the disclosure may be based generally on previously proposed principles for such modes of operation, for example as discussed above, but with modifications as described herein to provide additional functionality in accordance with embodiments of the present disclosure. Accordingly, aspects of the carrier aggregation and unlicensed spectrum operation which are not described in detail herein may be implemented in accordance with known techniques.

Modes of operation for the wireless telecommunications network 400 represented in FIG. 4 in accordance with certain embodiments of the disclosure will now be described. The general scenario for these embodiments is assumed to be one in which a carrier aggregation capable terminal device is operating in an LTE-A cell as normal, and the base station determines that it should configure the LTE-U capable terminal device with an additional aggregated carrier using LTE-U resources. The specific reason why the base station determines that it should configure a particular terminal device for LTE-U based carrier aggregation is not significant. Thus the LTE-A carrier provides a Pcell for the terminal device and the LTE-U resources provide one or more Scell(s) for the terminal device. It will be appreciated the LTE-A resources may also be used to provide component carriers associated with one or more further Scells(s) in accordance with conventional carrier aggregation techniques. For the examples described with reference to FIG. 4, the LTE-A transmissions in the licensed frequency band and the LTE-U transmissions in the unlicensed frequency band, and thus the Pcell and Scell(s), are both made from the same base station 404, but this may not be the case in other example embodiments. The LTE-U carrier could in general be utilised with a TDD (time division duplex) or FDD (frequency division duplex) frame structure. However, a consequence of some aspects of existing regulatory restrictions on unlicensed spectrum usage in some regions means that TDD or downlink-only FDD operation may, at least currently, be more likely.

Figure 5:
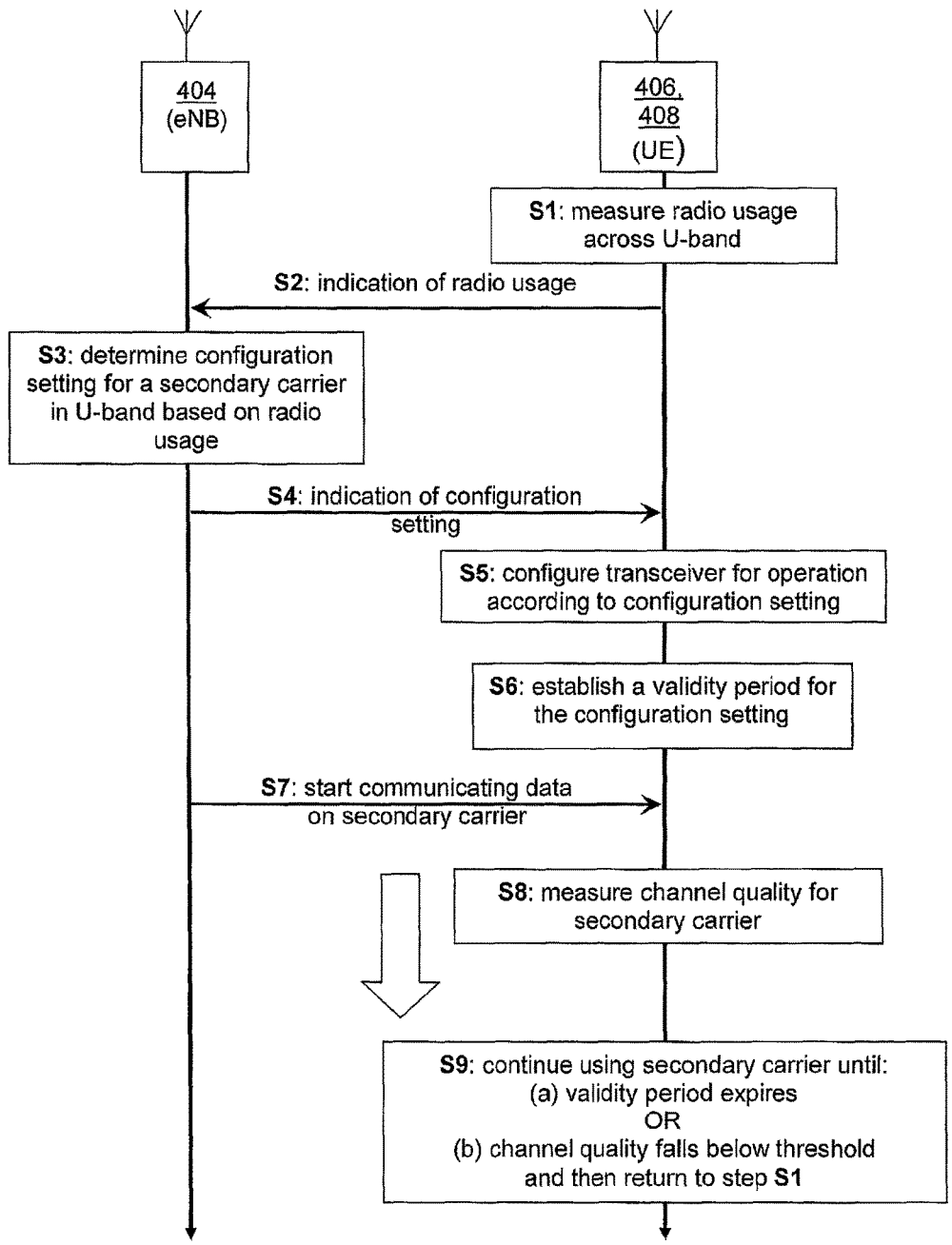
FIG. 5 is a signalling ladder diagrams representing communications between a base station and a terminal device operating in accordance with some embodiments of the disclosure.

FIG. 5 is a signalling ladder diagram schematically representing modes of operation for one of the terminal devices (UEs) 406, 408 and the base station (eNB) 404 schematically represented in FIG. 4. The operation is for communicating using a primary component carrier (associated with a primary cell) operating on radio resources within a first frequency band and a secondary component carrier (associated with a secondary cell) operating on radio resources within a second frequency band in accordance with certain embodiments of the present disclosure. As discussed above, the first frequency band is taken to correspond with resources that have been licensed for dedicated use by the operator of the wireless telecommunications system 400 whereas the second frequency band is taken to correspond with resources that are shared by other wireless communication technologies, and in particular in this example by Wi-Fi. In broad summary, some embodiments of the disclosure introduce the concept of a validity period for a configuration setting for a secondary carrier in the context of carrier aggregation using radio resources that are shared between different network operators and/or wireless access technologies.

The operation represented in FIG. 5 is generally iterative and is shown starting from a stage at which the terminal device is configured for operation on the primary cell associated with the primary carrier, but is not yet configured for operation on the secondary cell associated with the secondary carrier. This may be, for example, because the terminal device has only just connected to the primary cell or because a previous secondary cell configuration is no longer valid.

In step S1 the terminal device makes measurements of radio usage in the second frequency band in its environment. In particular, the terminal device measures the degree of radio usage at different frequencies across the second frequency band. For example, the terminal device may use its WLAN transceiver module to scan for activity associated with other wireless communication devices, for example, Wi-Fi access points. From this the terminal device may establish, for example, an indication of frequency resources used by other wireless communications devices and/or an indication of a received signal strength for wireless communications associated with other wireless communications devices and/or an indication of an identifier for the other wireless communications device (e.g. SSID). The terminal device may also scan for radio usage in the second frequency band by other devices operating according to other operating standards, for example Bluetooth and/or other LTE networks. In some embodiments the terminal device might not separately measure radio usage by different technologies, but may simply measure an aggregate level of radio signals (which may include radio noise) in its environment at different frequencies across the second frequency band.

In step S2 the terminal device transmits an indication of the measurements of radio usage at different frequencies across the second frequency band to the base station. This may be done on uplink radio resources on the already-configured primary cell to which the terminal device is connected in accordance with conventional signalling techniques, for example in accordance with the established principles of measurement report RRC signalling.

In Step S3, the base station determines a configuration setting for the secondary component carrier based on the received measurements of radio usage in the second frequency band. For example, the configuration setting may define transmission resources (e.g. in terms of time and/or frequency resources) selected from within the second frequency band to use for the secondary component carrier. The base station may determine appropriate transmission resources for the secondary cell configuration from the received measurements of radio usage in accordance with any established techniques for selecting appropriate transmission resources to use in a competitive (opportunistic) radio environment based on measurements of existing usage. For example, the base station may avoid transmission resources in regions of the second frequency band for which the terminal device measurement reports indicate a relatively high degree of radio usage, and may instead preferentially select a configuration for the secondary carrier that makes use of transmission resources in spectral regions having a relatively low degree of radio usage.

In step S4 the base station transmits an indication of the chosen configuration setting for the secondary carrier to the terminal device. This may be done on downlink radio resources on the already-configured primary cell in accordance with conventional signalling techniques, for example in accordance with the established principles of radio bearer (re)configuration message RRC signalling.

In step S5 the terminal device configures its transceiver unit (and in particular the LTE transceiver module component of its transceiver unit) in accordance with the configuration setting information received from the base station, for example by appropriate tuning of the transceiver circuitry. This may be formed in accordance with conventional techniques for radio bearer configuration setting.

In step S6 the terminal device establishes a validity period for the configuration setting for the secondary carrier received in step S4 and starts a corresponding validity timer. The validity period is a time duration for which the configuration setting is to be assumed to be valid, thereby providing for a semi-static/semi-persistent secondary cell configuration. The duration of the validity period for the configuration setting may in some cases be fixed. For example, the duration of the validity period may be defined in an operating standard for the wireless telecommunications system, for example based on regulatory agreements between different operators and/or access technologies to ensure "fairness". In another example, the duration of the validity period may be established from system information transmitted by the base station or from other signalling previously received from the base station, for example during initial connection establishment for the terminal device. In yet other examples, the duration of the validity period for a given configuration setting may be selected by the base station and communicated to the terminal device, for example in association with the indication of the configuration setting transmitted from the base station to the terminal device in step S4. This can allow for more flexible operation. For example, if the measurement reports received from the terminal device in step S2 indicate very little radio usage in the second frequency band, the base station may determine a relatively long validity period should be used, whereas if the measurement reports received from the terminal device in step S2 indicate relatively high radio usage in the second frequency band, the base data may determine a relatively short validity period should be used. That is to say, the validity period may be determined by taking account of the degree of radio traffic in the second frequency band. In some examples the duration of the validity period may be greater than an amount selected from the group comprising: 0.1 seconds; 1 second; 2 seconds; 3 second; and 5 seconds and/or less than an amount selected from the group comprising: 1 hour, 1 minute, 10 seconds; and 5 seconds. However, the specific values for the validity period may be selected according to the implementation at hand. In general, a longer validity period will reduce the frequency with which the terminal device should measure radio usage across the second frequency band and will reduce the associated signalling overhead, whereas a shorter validity period will reduce the extent to which communications between the base station and the terminal device interfere with other devices trying to access the shared resources of the second frequency band.

In step S7 the base station starts communicating with the terminal device using the primary carrier and the secondary carrier configured in accordance with the current configuration setting for the secondary component carrier. This may be done based on established carrier aggregation techniques and using previously-proposed techniques for making use of unlicensed frequency spectrum. The communication of data between the base station and the terminal device may continue as schematically indicated by the arrow below the representation of step S7 in FIG. 5.

In step S8 the terminal device measures channel quality for the secondary carrier. This is performed in parallel with the ongoing communication of data from the base station to the terminal device using the based on established channel quality measurement techniques in wireless telecommunications systems. In particular, the measurements undertaken in step S8 may correspond with those undertaken for conventional channel quality indicator (CQI) reporting in LTE wireless communication systems. That is to say, step S8 may correspond with the measurements that are already normally undertaken for conventional CQI reporting on a secondary cell is a carrier aggregation scenario (for example, using sounding reference symbols). In this regard, and although not shown in FIG. 5, the terminal device may report the channel quality measurements back to the base station to assist the base station in making scheduling decisions for allocating transmission resources to the terminal device on the secondary carrier in accordance with conventional LTE techniques.

The channel quality measurements of step S8 may continue in parallel with the ongoing communication of data using the first and secondary carriers that started in step S7. This may continue until one or other of two conditions is satisfied, as schematically indicated in step S9.

Thus, step S9 in FIG. 5 indicates that the base station and terminal device continue to communicate data using the primary and secondary carriers in accordance with conventional carrier aggregation techniques as applied to unlicensed spectrum operation until either (a) the validity period established in step S6 expires or (b) the channel quality measurements for the secondary carrier indicate the channel conditions associated with the secondary carrier have fallen below a threshold quality level. The threshold quality level may be determined according to the implementation at hand. For example, the threshold may correspond with a level below which the channel quality is considered to be too poor for supporting data transfer with at least a minimum acceptable data rate, or it may correspond with a level indicative of the presence of signals from devices using another radio access technology on the same frequency which would then simply identify potential interference from or to the other radio access technology.

If either of the relevant events occur, the terminal device assumes the configuration setting for the secondary carrier received in step S4 is no longer valid, and the terminal device returns to step S1 of the processing represented in FIG. 5. Thus, the terminal device again measures radio usage across the unlicensed band (second band) and proceeds to transmit an indication of the measures radio usage to the base station. Processing may then continue as described above. This results in the base station determining an updated configuration setting for the secondary carrier in a subsequent iteration of step S3, and communicating the updated configuration setting to the terminal device in a subsequent iteration of step S4, thereby allowing the terminal device to configure its LTE transceiver and subsequently receive data on the secondary carrier in accordance with the updated configuration setting, and so on, with repeated iterations through the steps of FIG. 5.

Thus the approach represented in FIG. 5 provides for a semi-persistent/semi-static secondary cell configuration (e.g. in terms of the transmission resources in the second frequency band which are to be used for the secondary carrier) to be used when aggregating unlicensed radio spectrum transmission resources with licensed radio spectrum transmission resources. This approach has been found by the inventors to provide a number of advantages. For example, the approach can help to conserve terminal device battery power since the terminal device can be configured to undertake the measurements of radio usage across the secondary frequency band which are used by the base station to determine a suitable configuration setting (e.g. frequency setting) for the secondary carrier only when the existing configuration becomes unusable and/or after the validity period has expired. The use of a validity period after which the radio usage across the second frequency band is re-measured by the terminal device and reported to the base station can help to prevent the wireless telecommunications system from overly impacting the ability of other wireless communication systems (e.g. Wi-Fi or Bluetooth or another LTE system) to use the shared resources of the unlicensed radio spectrum comprising the second frequency band.

It will be appreciated the approaches described above may be modified in accordance with other embodiments of the invention. For example, the order in which the steps of FIG. 5 are performed may be different in other implementations. For example, steps S5 and S6 may be reversed, or in the event the validity period is fixed, step S6 may be performed before step S1.

Furthermore, it will be appreciated that while in the above described embodiments the base station establishes an indication of radio usage across the U band based on measurements of channel conditions made by the terminal device and reported to the base station (in steps S1 and S2), in accordance with other embodiments of the disclosure, the base station may establish a measure of radio usage in the second frequency band in a different way. That is to say, in some embodiments of the disclosure a terminal device need not be involved in measuring and reporting channel conditions used by the base station to select an appropriate carrier configuration setting (i.e. in accordance with some embodiments there may be no steps correspondence with steps S1 and S2 described above). For example, the base station may itself measure radio usage at different frequencies across the second frequency band rather than, or in addition to, relying on feedback received from one or more terminal devices.

Furthermore, while the above-described embodiments have focused on an implementation in which a single secondary carrier/Scell is associated with the second frequency band, the same principles can be applied when using multiple secondary carrier(s)/Scell(s) in the second frequency band. In this case each of the multiple secondary carrier(s) may be associated with the same or different validity period, and may be configured at the same time or may be staggered.

Furthermore, it will be appreciated that in some example embodiments, step S9 may be modified so that a currently-used component carrier configuration becomes invalid only on expiry of its validity period. That is to say, the carrier configuration may, at least so far as the terminal device is concerned, remain valid even if the channel quality becomes very poor. In this case the base station may simply choose not to schedule further transmissions for the terminal device until the base station receives an updated indication of radio usage across the second carrier in an iteration of step S2 following expiry of the terminal device's validity period, thereby allowing the second carrier to be re-configured. Furthermore, in yet another example, step S9 may be modified so that a currently-used component carrier configuration becomes invalid only if the measured channel quality falls below the threshold level. That is to say, some implementations may not adopt an approach using a validity period. That is to say, there may be no step corresponding to S6.

Furthermore, in the examples described above it is assumed the terminal device will consider the secondary carrier configuration to become invalid if either of the conditions of step S9 are met. However, in another example the terminal device may return to step S1 as described above if either of the conditions of step S9 are met, but may nonetheless continue to assume the current configuration setting for the secondary carrier remains valid until an indication of a new configuration setting is received from the base station.

As described above, step S1 is performed in a repeated manner in response to one of the conditions of step S9 being met. However, in some examples step S1 may also be triggered by the base station. For example, the base station may be configured to transmit a message to the terminal device to request that the terminal device provides the base station with an indication of radio usage in the second frequency band (i.e. request that the terminal device performs steps corresponding to steps S1 and S2 in FIG. 5). This request may, for example, be made in accordance with conventional control signalling techniques on the primary carrier. This can allow the base station to initiate the process of reconfiguring the secondary carrier before the validity period expires or the channel conditions fall below an acceptable level. Furthermore, this can be the process by which the base station initiates step S1 in a first iteration of the process represented in FIG. 5 (i.e. when it is determined that carrier aggregation using resources in the second frequency band is to be commenced for the terminal device).

It will be appreciated that while the above-described embodiments are focused on a single base station supporting both the primary component carrier the secondary component carrier, more generally these could be transmitted from separate base stations. In this regard, the network-side processing in accordance with embodiments of the present disclosure may be performed by network infrastructure equipment which comprises, for example, one base station or more than one base station, and potentially other network infrastructure equipment elements according to the operating principles of the wireless telecommunications network in which the approach is implemented.

It will be appreciated the principles described above may be applied in respect of a wireless telecommunications system supporting carrier aggregation with secondary component carriers operating in a frequency band over which the wireless telecommunications system does not have exclusive control irrespective of whether or not the wireless telecommunications system requires an administrative license to operate in the secondary frequency band. That is to say, it will be appreciated the terminology "unlicensed" is used herein for convenience to refer to operation in a band over which the wireless telecommunications system does not have exclusive access. In many implementations this will correspond with a license exempt frequency band. However, in other implementations the operation may be applied in a frequency band which is not unlicensed in the strict administrative sense, but which is nonetheless available for shared/opportunistic use by devices operating according to different wireless access technologies (e.g. LTE-based, Wi-Fi-based and/or Bluetooth-based technologies) and/or multiple networks operating according to the same technology (e.g. LTE-based wireless communication systems provided by different network operators). In this regard the terminology such as "unlicensed frequency band" may be considered to refer generally to a frequency band in which resources are shared by different wireless communications systems. Accordingly, while the term "unlicensed" is commonly telecommunications system may nonetheless be required to hold an administrative license to operate in these frequency bands.

Thus there has been described a method of operating a terminal device and a base station in a wireless telecommunications system to communicate with one another using a primary component carrier operating on radio resources within a first frequency band and a secondary component carrier operating on radio resources within a second frequency band. The terminal device makes measurements of radio usage in the second frequency band, e.g. by other devices which are not part of the wireless telecommunications system but which can also use radio resources within the second frequency band. The terminal device transmits an indication of the measurements to the base station, and on the basis if this the base station establishes a configuration setting for the secondary component carrier, for example in terms of frequency resources to use for the secondary component carrier. The configuration setting is associated with a validity period during which the base station communicates data to the terminal device using the primary component carrier and the secondary component carrier operating in accordance with its configuration setting. When the validity period expires, the terminal device again measures and reports on radio usage so the base station can determine an updated configuration setting for the secondary component carrier that takes account of any changes in radio usage during the validity period.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a terminal device in a wireless telecommunications system for communicating with network infrastructure equipment using a primary component carrier operating on radio resources within a first frequency band and a secondary component carrier operating on radio resources within a second frequency band, wherein the method comprises the steps: (a) receiving an indication of a configuration setting for the secondary component carrier from the network infrastructure equipment; (b) establishing a validity period for the configuration setting for the secondary component carrier; and (c) receiving data from the network infrastructure equipment using the primary component carrier and the secondary component carrier operating in accordance with the configuration setting for the secondary component carrier during the validity period for the configuration setting.

Paragraph 2. The method of paragraph 1, further comprising making measurements of radio usage in the second frequency band and transmitting an indication of the measurements of radio usage in the second frequency band to the network infrastructure equipment prior to step (a).

Paragraph 3. The method of paragraph 2, further comprising determining if the validity period for the configuration setting for the secondary component carrier has expired, and if so, making measurements of radio usage in the second frequency band and transmitting an indication of the measurements of radio usage in the second frequency band to the network infrastructure equipment.

Paragraph 4. The method of any one of paragraphs 1 to 3, further comprising determining if the validity period for the configuration setting for the secondary component carrier has expired, and if so, releasing the configuration setting.

Paragraph 5. The method of any one of paragraphs 1 to 4, further comprising: receiving an indication of an updated configuration setting for the secondary component carrier from the network infrastructure equipment after the validity period for the configuration setting for the secondary component carrier has expired; establishing a validity period for the updated configuration setting for the secondary component carrier; and receiving data from the network infrastructure equipment using the primary component carrier and the secondary component carrier operating in accordance with the updated configuration setting for the secondary component carrier during the validity period for the updated configuration setting.

Paragraph 6. The method of any one of paragraphs 1 to 5, further comprising performing channel quality measurements for the secondary component carrier and determining if the channel quality measurements indicate the channel quality is below a threshold channel quality, and if so, making measurements of radio usage in the second frequency band and transmitting an indication of the measurements of radio usage in the second frequency band to the network infrastructure equipment.

Paragraph 7. The method of paragraph 6, further comprising: receiving an indication of an updated configuration setting for the secondary component carrier from the network infrastructure equipment after transmitting an indication of the measurements of radio usage in the second frequency band to the network infrastructure equipment; establishing a validity period for the updated configuration setting for the secondary component carrier; and receiving data from the network infrastructure equipment using the primary component carrier and the secondary component carrier operating in accordance with the updated configuration setting for the secondary component carrier during the validity period for the updated configuration setting.

Paragraph 8. The method of any one of paragraphs 1 to 7, further comprising receiving a request from the network infrastructure equipment to provide the network infrastructure equipment with an indication of radio usage in the second frequency band, and making measurements of radio usage in the second frequency band and transmitting an indication of the measurements of radio usage in the second frequency band to the network infrastructure equipment in response thereto.

Paragraph 9. The method of paragraph 8, further comprising: receiving an indication of an updated configuration setting for the secondary component carrier from the network infrastructure equipment after transmitting an indication of the measurements of radio usage in the second frequency band to the network infrastructure equipment in response to receiving the request from the network infrastructure equipment; establishing a validity period for the updated configuration setting for the secondary component carrier; and receiving data from the network infrastructure equipment using the primary component carrier and the secondary component carrier operating in accordance with the updated configuration setting for the secondary component carrier during the validity period for the updated configuration setting.

Paragraph 10. The method of paragraph 2, wherein the indication of the measurements of radio usage in the second frequency band are transmitted to the network infrastructure equipment using transmission resources in the first frequency band.

Paragraph 11. The method of paragraph 2, wherein the indication of the measurements of radio usage in the second frequency band are transmitted to the network infrastructure equipment using radio resource control, RRC, signalling.

Paragraph 12. The method of any one of paragraphs 1 to 11, wherein the indication of a configuration setting for the secondary component carrier is received from the network infrastructure equipment using transmission resources in the first frequency band.

Paragraph 13. The method of any one of paragraphs 1 to 12, wherein the indication of a configuration setting for the secondary component carrier is received from the network infrastructure equipment using radio resource control, RRC, signalling.

Paragraph 14. The method of any one of paragraphs 1 to 13, wherein the second frequency band comprises radio resources which are shared with wireless communication devices that are not part of the wireless telecommunications system.

Paragraph 15. The method of paragraph 2, wherein communications from the network infrastructure equipment are received by the terminal device with a receiver operating in accordance with a first wireless communications operating standard and the measurements of radio usage in the second frequency band are made with a receiver operating in accordance with a second wireless communications operating standard that is different from the first wireless communications operating standard.

Paragraph 16. The method of paragraph 15, wherein the first wireless communications operating standard is a cellular telecommunications operating standard and the second wireless communications operating standard is a non-cellular telecommunications operating standard.

Paragraph 17. The method of paragraph 15 or 16, wherein the second wireless communications operating standard is a wireless local area network, WLAN, operating standard.

Paragraph 18. The method of paragraph 2, wherein the indication of the measurements of radio usage in the second frequency band transmitted to the network infrastructure equipment comprises information regarding the use of radio resources in the second frequency band by another wireless communications device.

Paragraph 19. The method of paragraph 18, wherein the information comprises one or more of: an indication of frequency resources used by the other wireless communications device; an indication of a received signal strength for wireless communications associated with the other wireless communications device; and an indication of an identifier for the other wireless communications device.

Paragraph 20. The method of any one of paragraphs 1 to 19, wherein the validity period is established in accordance with an operating standard for the wireless telecommunications system.

Paragraph 21. The method of any one of paragraphs 1 to 20, wherein the validity period is established from information received from the network infrastructure equipment in association with the configuration setting for the secondary component carrier received from the network infrastructure equipment.

Paragraph 22. The method of any one of paragraphs 1 to 21, wherein the duration of the validity period is greater than an amount selected from the group comprising: 0.1 seconds; 1 second; 2 seconds; 3 second; and 5 seconds.

Paragraph 23. The method of any one of paragraphs 1 to 22, wherein the duration of the validity period is less than an amount selected from the group comprising: 1 hour, 1 minute, 10 seconds; and 5 seconds.

Paragraph 24. The method of any one of paragraphs 1 to 23, wherein the configuration setting for the secondary component carrier comprises an indication of transmission resources to be used for the secondary component carrier.

Paragraph 25. A terminal device for use in a wireless telecommunications system for communicating with network infrastructure equipment using a primary component carrier operating on radio resources within a first frequency band and a secondary component carrier operating on radio resources within a second frequency band, wherein the terminal device comprises a controller unit and a transceiver unit configured to operate together to: (a) receive an indication of a configuration setting for the secondary component carrier from the network infrastructure equipment; (b) establish a validity period for the configuration setting for the secondary component carrier; and (c) receive data from the network operating in accordance with the configuration setting for the secondary component carrier during the validity period for the configuration setting.

Paragraph 26. Circuitry for a terminal device for use in a wireless telecommunications system for communicating with network infrastructure equipment using a primary component carrier operating on radio resources within a first frequency band and a secondary component carrier operating on radio resources within a second frequency band, wherein the circuitry comprises a controller element and a transceiver element configured to operate together to: (a) receive an indication of a configuration setting for the secondary component carrier from the network infrastructure equipment; (b) establish a validity period for the configuration setting for the secondary component carrier; and (c) receive data from the network infrastructure equipment using the primary component carrier and the secondary component carrier operating in accordance with the configuration setting for the secondary component carrier during the validity period for the configuration setting.

Paragraph 27. A method of operating network infrastructure equipment in a wireless telecommunications system for communicating with a terminal device using a primary component carrier operating on radio resources within a first frequency band and a secondary component carrier operating on radio resources within a second frequency band, wherein the method comprises the steps: (a) establishing an indication of radio usage in the second frequency band; (b) determining a configuration setting for the secondary component carrier based on the indication of radio usage in the second frequency band; (d) establishing a validity period for the configuration setting for the secondary component carrier; (e) transmitting an indication of the configuration setting for the secondary component carrier to the terminal device; (f) transmitting data to the terminal device using the primary component carrier and the secondary component carrier operating in accordance with the configuration setting for the secondary component carrier during the validity period for the configuration setting; and (g) determining if the validity period for the configuration setting for the secondary component carrier has expired, and if so, repeating steps (a) and (b).

Paragraph 28. Network infrastructure equipment for use in a wireless telecommunications system for communicating with a terminal device using a primary component carrier operating on radio resources within a first frequency band and a secondary component carrier operating on radio resources within a second frequency band, wherein the network infrastructure equipment comprises a controller unit and a transceiver unit configured to operate together to: (a) establish an indication of radio usage in the second frequency band; (b) determine a configuration setting for the secondary component carrier based on the indication of measurements of radio usage in the second frequency band; (d) establish a validity period for the configuration setting for the secondary component carrier; (e) transmit an indication of the configuration setting for the secondary component carrier to the terminal device; (f) transmit data to the terminal device using the primary component carrier and the secondary component carrier operating in accordance with the configuration setting for the secondary component carrier during the validity period for the configuration setting; and (g) determine if the validity period for the configuration setting for the secondary component carrier has expired, and if so, to again receive from the terminal device an indication of measurements of radio usage in the second frequency band made by the terminal device and determine a configuration setting for the secondary component carrier based on the received measurements of radio usage in the second frequency band.

Paragraph 29. Circuitry for network infrastructure equipment for use in a wireless telecommunications system for communicating with a terminal device using a primary component carrier operating on radio resources within a first frequency band and a secondary component carrier operating on radio resources within a second frequency band, wherein the circuitry comprises a controller element and a transceiver element configured to operate together to: (a) establish an indication of measurements of radio usage in the second frequency band; (b) determine a configuration setting for the secondary component carrier based on the indication of measurements of radio usage in the second frequency band; (d) establish a validity period for the configuration setting for the secondary component carrier; (e) transmit an indication of the configuration setting for the secondary component carrier to the terminal device; (f) transmit data to the terminal device using the primary component carrier and the secondary component carrier operating in accordance with the configuration setting for the secondary component carrier during the validity period for the configuration setting; and (g) determine if the validity period for the configuration setting for the secondary component carrier has expired, and if so, to again receive from the terminal device an indication of measurements of radio usage in the second frequency band made by the terminal device and determine a configuration setting for the secondary component carrier based on the received measurements of radio usage in the second frequency band.

REFERENCES

[1] Holma H. and Toskala A, "LTE for UMTS OFDMA and SC-FDMA based radio access", John Wiley and Sons, 2009
[2] ETSI TS 136 211 V11.5.0 (2014-January)/3GPP TS 36.211 version 11.5.0 Release 11
[3] ETSI TS 136 212 V11.4.0 (2014-January)/3GPP TS 36.212 version 11.4.0 Release 11
[4] ETSI TS 136 213 V11.6.0 (2014-March)/3GPP TS 36.213 version 11.6.0 Release 11
[5] ETSI TS 136 321 V11.5.0 (2014-March)/3GPP TS 36.321 version 11.5.0 Release 11
[6] ETSI TS 136 331 V11.7.0 (2014-March)/3GPP TS 36.331 version 11.7.0 Release 11

What is claimed is:

1. A method of operating a terminal device in a wireless telecommunications system for communicating with network infrastructure equipment using a primary component carrier operating on first radio resources within a first frequency band and a secondary component carrier operating on second radio resources within a second frequency band, the method comprising:
receiving an indication of a configuration setting for the secondary component carrier, by the terminal device from the network infrastructure equipment, the configuration setting indicating specific radio resources of the second radio resources for operation of the secondary component carrier;
establishing, by the terminal device from the network infrastructure equipment, a validity period for the configuration setting for the secondary component carrier; and
receiving data, by the terminal device from the network infrastructure equipment, via both the primary component carrier and the secondary component carrier, the secondary component carrier operating in accordance with the configuration setting for the secondary component carrier during the validity period for the configuration setting.

2. The method of claim 1, further comprising making measurements of radio usage in the second frequency band and transmitting an indication of the measurements of radio usage in the second frequency band to the network infrastructure equipment prior to receiving the indication.

3. The method of claim 2, further comprising determining if the validity period for the configuration setting for the secondary component carrier has expired, and if so, making measurements of radio usage in the second frequency band and transmitting an indication of the measurements of radio usage in the second frequency band to the network infrastructure equipment.

4. The method of claim 1, further comprising determining if the validity period for the configuration setting for the secondary component carrier has expired, and if so, releasing the configuration setting.

5. The method of claim 1, further comprising:
receiving an indication of an updated configuration setting for the secondary component carrier from the network infrastructure equipment after the validity period for the configuration setting for the secondary component carrier has expired;
establishing a validity period for the updated configuration setting for the secondary component carrier; and
receiving data from the network infrastructure equipment using the primary component carrier and the secondary component carrier operating in accordance with the updated configuration setting for the secondary component carrier during the validity period for the updated configuration setting.

6. The method of claim 1, further comprising performing channel quality measurements for the secondary component carrier and determining if the channel quality measurements indicate the channel quality is below a threshold channel quality, and if so, making measurements of radio usage in the second frequency band and transmitting an indication of the measurements of radio usage in the second frequency band to the network infrastructure equipment.

7. The method of claim 6, further comprising:
receiving an indication of an updated configuration setting for the secondary component carrier from the network infrastructure equipment after transmitting an indication of the measurements of radio usage in the second frequency band to the network infrastructure equipment;
establishing a validity period for the updated configuration setting for the secondary component carrier; and
receiving data from the network infrastructure equipment using the primary component carrier and the secondary component carrier operating in accordance with the updated configuration setting for the secondary component carrier during the validity period for the updated configuration setting.

8. The method of claim 1, further comprising receiving a request from the network infrastructure equipment to provide the network infrastructure equipment with an indication of radio usage in the second frequency band, and making measurements of radio usage in the second frequency band and transmitting an indication of the measurements of radio usage in the second frequency band to the network infrastructure equipment in response thereto.

9. The method of claim 8, further comprising:
receiving an indication of an updated configuration setting for the secondary component carrier from the network infrastructure equipment after transmitting an indication of the measurements of radio usage in the second frequency band to the network infrastructure equipment in response to receiving the request from the network infrastructure equipment;
establishing a validity period for the updated configuration setting for the secondary component carrier; and
receiving data from the network infrastructure equipment using the primary component carrier and the secondary component carrier operating in accordance with the updated configuration setting for the secondary component carrier during the validity period for the updated configuration setting.

10. The method of claim 2, wherein the indication of the measurements of radio usage in the second frequency band are transmitted to the network infrastructure equipment using transmission resources in the first frequency band.

11. The method of claim 2, wherein the indication of the measurements of radio usage in the second frequency band are transmitted to the network infrastructure equipment using radio resource control, RRC, signalling.

12. The method of claim 1, wherein the indication of a configuration setting for the secondary component carrier is received from the network infrastructure equipment using transmission resources in the first frequency band.

13. The method of claim 1, wherein the indication of a configuration setting for the secondary component carrier is received from the network infrastructure equipment using radio resource control, RRC, signalling.

14. The method of claim 1, wherein the second frequency band comprises radio resources which are shared with wireless communication devices that are not part of the wireless telecommunications system.

15. The method of claim 2, wherein communications from the network infrastructure equipment are received by the terminal device with a receiver operating in accordance with a first wireless communications operating standard and the measurements of radio usage in the second frequency band are made with a receiver operating in accordance with a second wireless communications operating standard that is different from the first wireless communications operating standard.

16. The method of claim 15, wherein the first wireless communications operating standard is a cellular telecommunications operating standard and the second wireless communications operating standard is a non-cellular telecommunications operating standard.

17. The method of claim 15, wherein the second wireless communications operating standard is a wireless local area network, WLAN, operating standard.

18. The method of claim 2, wherein the indication of the measurements of radio usage in the second frequency band transmitted to the network infrastructure equipment comprises information regarding the use of radio resources in the second frequency band by another wireless communications device.

19. The method of claim 18, wherein the information comprises one or more of: an indication of frequency resources used by the other wireless communications device; an indication of a received signal strength for wireless communications associated with the other wireless communications device; and an indication of an identifier for the other wireless communications device.

20. The method of claim 1, wherein the validity period is established in accordance with an operating standard for the wireless telecommunications system.

21. The method of claim 1, wherein the validity period is established from information received from the network infrastructure equipment in association with the configuration setting for the secondary component carrier received from the network infrastructure equipment.

22. The method of claim 1, wherein the duration of the validity period is greater than an amount selected from the group comprising:
0.1 seconds;
1 second;
2 seconds;
3 second; and
5 seconds.

23. The method of claim 1, wherein the duration of the validity period is less than an amount selected from the group comprising:
1 hour;
1 minutes;
10 seconds; and
5 seconds.

24. The method of claim 1, wherein the configuration setting for the secondary component carrier comprises an indication of transmission resources to be used for the secondary component carrier.

25. A terminal device for use in a wireless telecommunications system for communicating with network infrastructure equipment using a primary component carrier operating on fir radio resources within a first frequency band and a secondary component carrier operating on second radio resources within a second frequency band, the terminal device comprising:
circuitry; and
a transceiver, the circuitry and the transceiver configured to operate together to:
receive an indication of a configuration setting for the secondary component carrier from the network infrastructure equipment, the configuration setting indicating specific radio resources of the second radio resources for operation of the secondary component carrier;

establish a validity period for the configuration setting for the secondary component carrier; and receive data, from the network infrastructure equipment, via both the primary component carrier and the secondary component carrier, the secondary component carrier operating in accordance with the configuration setting for the secondary component carrier during the validity period for the configuration setting.

26. Circuitry for network infrastructure equipment for use in a wireless telecommunications system for communicating with a terminal device using a primary component carrier operating on first radio resources within a first frequency band and a secondary component carrier operating on second radio resources within a second frequency band, the circuitry comprising:

control circuitry; and a transceiver, the control circuitry and the transceiver configured to operate together to:

establish an indication of measurements of radio usage in the second frequency band;

determine a configuration setting for the secondary component carrier based on the indication of measurements of radio usage in the second frequency band, the configuration setting indicating specific radio resources of the second radio resources for operation of the secondary component carrier;

transmit an indication of the configuration setting for the secondary component carrier to the terminal device;

transmit data, to the terminal device, via both the primary component carrier and the secondary component carrier, the secondary component carrier operating in accordance with the configuration setting for the secondary component carrier during a validity period for the configuration setting, the validity period for the configuration setting having been established by the terminal device for the secondary component carrier; and receive, from the terminal device when the terminal device determines that the validity period for the configuration setting for the secondary component carrier has expired, an indication of measurements of radio usage in the second frequency band made by the terminal device and determine a new configuration setting for the secondary component carrier based on the received measurements of radio usage in the second frequency band.

* * * * *